United States Patent
Khatib et al.

(12) 
(10) Patent No.: US 10,949,696 B2
(45) Date of Patent: Mar. 16, 2021

(54) OBJECT PROCESSING FOR IMAGING

(71) Applicant: Hewlett-Packard Development Company, L.P., Spring, TX (US)

(72) Inventors: Imtiyaz Altafhussain Khatib, Singapore (SG); Jose Mattathilanickal Chacko, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/631,386

(22) PCT Filed: Jul. 17, 2017

(86) PCT No.: PCT/US2017/042361
§ 371 (c)(1),
(2) Date: Jan. 15, 2020

(87) PCT Pub. No.: WO2019/017873
PCT Pub. Date: Jan. 24, 2019

(65) Prior Publication Data
US 2020/0218925 A1    Jul. 9, 2020

(51) Int. Cl.
*G06K 9/32* (2006.01)
*H04N 1/00* (2006.01)
*G06K 9/46* (2006.01)

(52) U.S. Cl.
CPC ......... *G06K 9/3241* (2013.01); *G06K 9/4604* (2013.01); *H04N 1/00411* (2013.01); *H04N 1/00456* (2013.01); *H04N 1/00687* (2013.01)

(58) Field of Classification Search
CPC ............... G06K 9/3241; G06K 9/4604; H04N 1/00411; H04N 1/00442; H04N 1/00453; H04N 1/00456; H04N 1/00458; H04N 1/00687; H04N 1/203; H04N 2201/0094; H04N 1/506; H04N 1/00018; H04N 1/00023; H04N 1/00045; H04N 1/00063; H04N 1/00068; H04N 1/00082;
(Continued)

(56) References Cited

U.S. PATENT DOCUMENTS

| 7,209,580 B2 * | 4/2007 | Grass .................. G01N 23/046 378/14 |
| 7,305,129 B2 | 12/2007 | Chellapilla et al. |

(Continued)

OTHER PUBLICATIONS

Hp Scanjet G3110 Photo Scanner ~ Jun. 2008 < http://h71016.www7.hp.com/html/pdfs/SJG3110.pdf > 2 pages.
(Continued)

*Primary Examiner* — Negussie Worku
(74) *Attorney, Agent, or Firm* — HP Inc. Patent Department

(57) ABSTRACT

The present subject matter describes processing of objects for imaging in an imaging system. In an example implementation, a visual image of a plurality of objects disposed on an imaging bed of the imaging system is generated. A visual image of the imaging bed divided into a plurality of imaging zones is generated. Each of the plurality of objects are identified within a respective imaging zone from the plurality of imaging zones. Each of the plurality of imaging zones are assigned a corresponding imaging operation, where the imaging operation is one of a scan&print operation and a scan-only operation.

20 Claims, 8 Drawing Sheets

(58) Field of Classification Search
CPC .......... H04N 1/00039; H04N 1/00084; H04N 1/00795; H04N 1/4005; H04N 2201/0082; G03G 15/0131; G03G 15/5062; G03G 2215/0161; B41J 19/202; B41J 19/207; B41J 2029/3935; B41J 25/003; B41J 29/393; B41J 2/01; B41J 2/04593; B41J 2/2135; B41J 2/2142
USPC ........................................................ 358/474
See application file for complete search history.

(56) References Cited

U.S. PATENT DOCUMENTS

| | | | |
|---|---|---|---|
| 7,657,121 B2 | 2/2010 | Chen | |
| 7,733,541 B2 | 6/2010 | Liu | |
| 8,054,514 B2 | 11/2011 | Marappan | |
| 8,619,313 B2 | 12/2013 | Baggs et al. | |
| 8,913,285 B1 * | 12/2014 | Neubrand | H04N 1/3873 358/1.9 |
| 8,964,239 B2 | 2/2015 | Prabhu et al. | |
| 9,241,084 B2 | 1/2016 | Isaev | |
| 10,244,144 B1 * | 3/2019 | Kodimer | H04N 1/00809 |
| 2004/0145784 A1 | 7/2004 | Murray et al. | |
| 2005/0068583 A1 * | 3/2005 | Gutkowski | H04N 1/3877 358/1.18 |
| 2005/0157944 A1 | 7/2005 | Chung | |
| 2006/0158700 A1 | 7/2006 | Byun et al. | |
| 2007/0098394 A1 * | 5/2007 | Baggs | G03G 15/60 396/299 |
| 2008/0005684 A1 | 1/2008 | Ochs et al. | |
| 2011/0110610 A1 | 5/2011 | Hashiguchi | |
| 2011/0292457 A1 * | 12/2011 | Miyata | H04N 1/00801 358/406 |
| 2014/0002080 A1 * | 1/2014 | Den Harder | G01R 33/445 324/309 |
| 2014/0153017 A1 * | 6/2014 | Watanabe | H04N 1/00095 358/1.13 |
| 2014/0198350 A1 | 7/2014 | Prabhu | |
| 2019/0113643 A1 * | 4/2019 | Laronga | G01V 1/306 |
| 2019/0132462 A1 * | 5/2019 | Ogawa | H04N 1/00702 |
| 2019/0216574 A1 * | 7/2019 | Coleman | A61B 5/0064 |
| 2019/0356790 A1 * | 11/2019 | Kamata | G06T 7/73 |
| 2020/0137233 A1 * | 4/2020 | Wilson | H04N 1/00718 |

OTHER PUBLICATIONS

Scan Muitiple Images Simultaneously 2003 < https://files.support.epson.com/htmldocs/ex10kg/ex10kgrf/howto_4.htm > 5 pages.

* cited by examiner

IMAGING SYSTEM 100

IMAGING MANAGER 102

[[ GENERATE, AT A DISPLAY UNIT, A VISUAL IMAGE OF THE PLURALITY OF OBJECTS;

GENERATE, AT THE DISPLAY UNIT, A VISUAL IMAGE OF THE IMAGING BED DIVIDED INTO A PLURALITY OF IMAGING ZONES;

IDENTIFY EACH OF THE PLURALITY OF OBJECTS WITHIN A RESPECTIVE IMAGING ZONE FROM THE PLURALITY OF IMAGING ZONES;

ASSIGN TO EACH OF THE PLURALITY OF IMAGING ZONES A CORRESPONDING IMAGING OPERATION, WHERE THE IMAGING OPERATION IS ONE OF A SCAN&PRINT OPERATION AND A SCAN-ONLY OPERATION; AND

ASSIGN A SET OF IMAGING ATTRIBUTES TO EACH OF THE PLURALITY OF IMAGING ZONES, WHEREIN THE SET OF IMAGING ATTRIBUTES IS INDICATIVE OF IMAGING SETTINGS TO BE APPLIED TO EACH OF THE PLURALITY OF OBJECTS IDENTIFIED WITHIN THE RESPECTIVE IMAGING ZONE ]]

DISPLAY UNIT 104

IMAGING BED 106

Fig. 1

OBJECT PROCESSING FOR IMAGING

BACKGROUND

Imaging systems, such as photocopiers and multi-function printers have scanning and printing capabilities. Objects, such as photographs, pages of books, certificates, receipts, identification cards, or the like, may be scanned and printed in order to reproduce them. The imaging systems may produce electronic copies of the objects by scanning and duplicate physical copies by scanning and printing.

BRIEF DESCRIPTION OF DRAWINGS

The following detailed description references the drawings, wherein:

FIG. 1 illustrates an imaging system having an imaging manager, according to an example implementation of the present subject matter;

DETAILED DESCRIPTION

Figure 2:
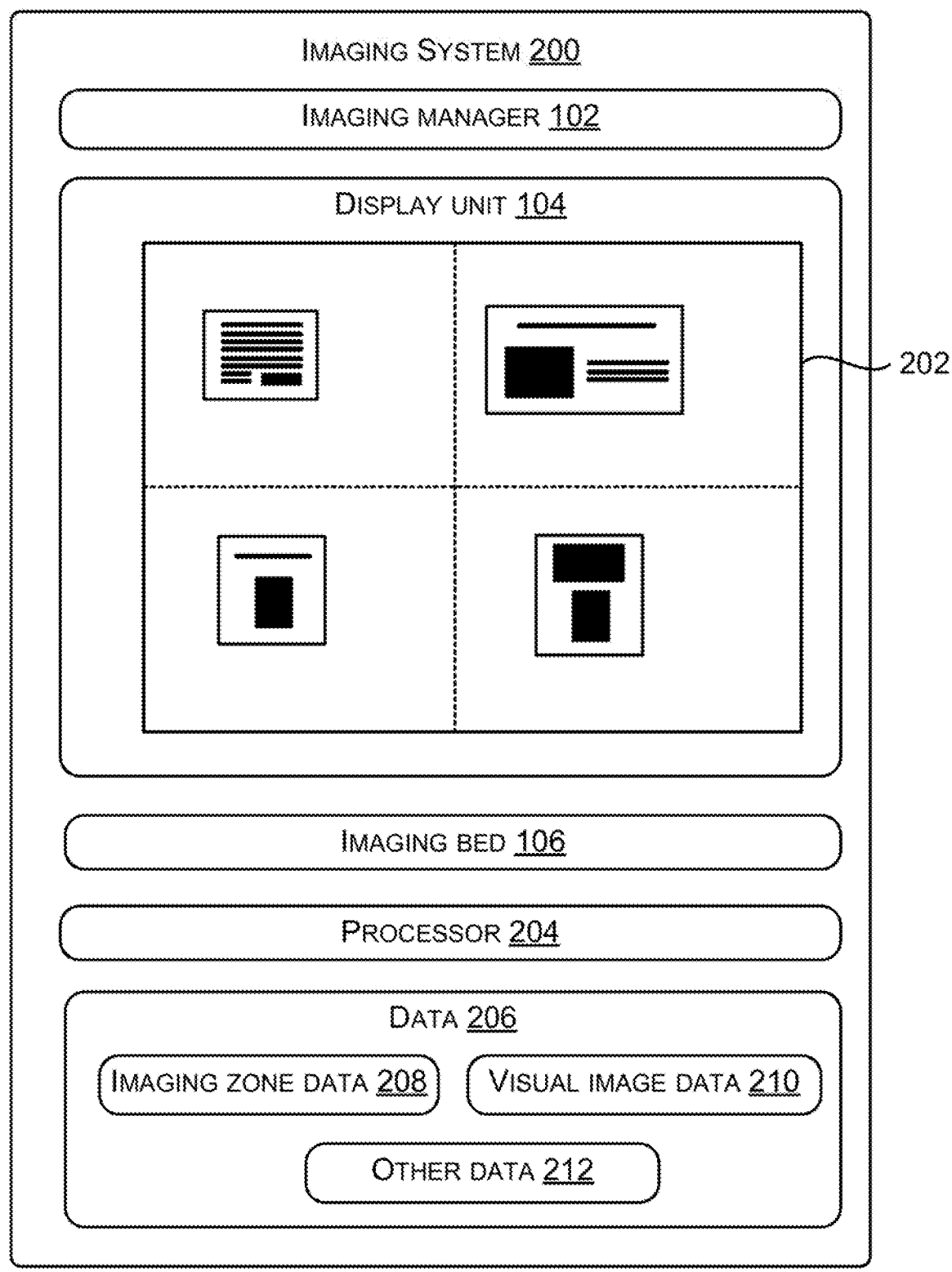
FIG. 2 illustrates an imaging system, according to an example implementation of the present subject matter.

An imaging system includes an imaging bed on which objects may be arranged for being reproduced. The imaging bed may be a glass flatbed or platen. After the objects are placed on the imaging bed, the objects may be subjected to an imaging operation. In an example, the imaging operation may be a scan-only operation in which a scanner light is passed over the objects placed on the imaging bed. After completion of the scan-only operation, scanned images of the objects in an electronic form can be stored in a memory of the imaging system or may be transferred to other electronic devices, such as laptops, desktops, smart phones, etc., which may be coupled to the imaging system. In another example, the imaging operation may be a scan&print operation which includes a scan-only operation followed by a print operation performed on the scanned images of the objects. After completion of the scan&print operation, the final output from the imaging system are duplicate copies of the objects in a printed form.

Imaging systems generally process a single imaging operation on multiple objects that are simultaneously placed on and imaged through the imaging bed. In an example scenario, a person may have two objects, for example a receipt from a stationary store and a photograph, to be reproduced. The person may desire to obtain a copy of the photograph in an electronic form and a copy of the receipt in a printed form. Thus, the photograph is to be subjected to a scan-only operation whereas the receipt is to be subjected to a scan&print operation. In the example scenario, if the receipt and the photograph are imaged simultaneously, both may be subjected to either a scan-only operation or a scan&print operation. In order to obtain a duplicate copy of the photograph in an electronic form and a duplicate copy of the receipt in a printed form, the photograph and the receipt are to be placed on the imaging bed, one at a time. For example, the photograph may be placed on the imaging bed at first. After placing the photograph on the imaging bed, a scan-only operation is performed by the imaging system. Then the photograph may be removed and the receipt may be arranged on the imaging bed, and the scan&print operation is performed on the receipt. Imaging systems are thus unable to produce a scanned electronic copy of one object and a printed copy of another object, when both the objects are imaged simultaneously.

When a large number of such different objects are to be reproduced, where some of the objects are to be scanned in an electronic form and some are to be duplicated in a printed form, the overall processing time of the imaging system may increase. Also, since the different objects are arranged and imaged serially and separately, the complexity and the manual effort involved in handling the multiple objects by a user of the imaging system may be large.

The present subject matter describes techniques of processing objects for imaging in an imaging system. With the techniques of the present subject matter, different imaging operations may be applied onto different objects which are imaged simultaneously. For example, with multiple objects simultaneously placed on the imaging bed, some objects may be subjected to a scan-only operation and others may be subjected to a scan&print operation. This may reduce complexity in processing the objects for imaging, may reduce the overall processing time, and may provide enhanced user experience by reducing the manual effort of the user, otherwise consumed in serially imaging the objects.

In an example implementation of the present subject matter, a visual image of a plurality of objects disposed on the imaging bed is generated. A visual image of the imaging bed divided into a plurality of imaging zones is also generated. Each of the plurality of objects are identified within a respective imaging zone and a corresponding imaging operation is assigned to each of the plurality of imaging zones, where the imaging operation is one of a scan&print operation and a scan-only operation. The object associated with each imaging zone is then either only scanned or scanned and printed according to the imaging operation assigned to the respective imaging zone.

Thus, the present subject matter enables grouping objects in a respective imaging zone and allows selective assignment of one of a scan-only operation and a scan&print operation for each object within the respective imaging zone. This may help to reduce complexity in handling objects for imaging, reduce manual effort of the user, and provide an enriched user experience. Further, in an example implementation of the present subject matter, if an object is placed in the imaging bed in such a way that it overlaps with two/more imaging zones, then the object is identified within the imaging zone in which the maximum portion (area) of the object lies and the imaging operation associated with that imaging zone is applied to the object. In another example implementation, the user may select a layout of the imaging zones in which the imaging bed may be divided. The present subject matter by providing the user selectable layouts of imaging zones helps to enhance user experience during simultaneously processing multiple objects for imaging.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates an imaging system 100 having an imaging manager 102, according to an example implementation of the present subject matter. The imaging system 100, also referred to as the system 100, has scanning and printing capabilities. Examples of the imaging system 100 include a photocopier, a multi-function printer, or the like.

In an example implementation, the imaging manager 102 may be implemented through a combination of any suitable hardware and computer-readable instructions. The imaging manager 102 may be implemented in a number of different ways to perform various functions for the purposes of processing objects to be imaged by the system 100. For example, the computer-readable instructions for the imaging manager 102 may be processor-executable instructions stored in a non-transitory computer-readable storage medium, and the hardware for the imaging manager 102 may include a processing resource (e.g., processor(s)), to execute such instructions. In the present examples, the non-transitory computer-readable storage medium stores instructions which, when executed by the processing resource, implements the imaging manager 102. The system 100 may include the non-transitory computer-readable storage medium storing the instructions and the processing resource (not shown) to execute the instructions. In an example, the non-transitory computer-readable storage medium storing the instructions may be external, but accessible to the processing resource of the system 100. In another example, the imaging manager 102 may be implemented by electronic circuitry.

The system 100 further includes a display unit 104. Examples of the display unit 104 may include, but are not limited to, a liquid crystal display (LCD) panel. The display unit 104 may be touch-enabled. In an example implementation, the display unit 104 may be integrated within a control panel of the system 100. The display unit 104 is operable to render a preview of a plurality of objects to be scanned and/or scanned and printed by the system 100. In an example implementation, the preview may be displayed in a user interface rendered on the display unit 104. The imaging manager 102 may be in communication with the display unit 104 for performing several functions for the purpose of generating previews and receiving user inputs.

The system 100 further includes an imaging bed 106. In an example implementation, the imaging bed 106 may be a glass bed having a flat surface. The plurality of objects to be imaged may be arranged on the imaging bed 106. In an example implementation, the system 100 may be mechanically coupled to a lid (not shown) which can cover the imaging bed 106.

In an example implementation, a plurality of objects may be arranged on the imaging bed 106 and the lid may be closed to overlay on the imaging bed 106. The imaging manager 102 may generate a visual image of the plurality of objects at the display unit 104. In an example implementation, the visual image is a preview of the objects disposed on the imaging bed 106.

Upon generating the visual image of the objects, the imaging manager 102 may receive one or more than one user input(s) based on which the imaging manager 102 may generate, at the display unit 104, a visual image of the imaging bed 106 divided into a plurality of imaging zones. An imaging zone corresponds to a portion or area of the imaging bed 106 previewed and displayed in the display unit 104.

The imaging manager 102 may identify each of the plurality of objects within a respective imaging zone from the plurality of imaging zones. In an example implementation, an object on being identified within the respective zone may be associated with the respective imaging zone. Properties and characteristics of the respective imaging zone may be applied to the object(s) identified within the respective zone.

The imaging manager 102 may assign to each of the plurality of imaging zones a corresponding imaging operation. The imaging operation may be one of a scan&print operation and a scan-only operation. The object associated with each imaging zone is then either only scanned or scanned and printed according to the imaging operation assigned to the respective imaging zone. Thus, the present subject matter facilitates in reducing the time for collectively processing multiple objects which are to be duplicated differently and enhances user convenience in object scanning and copying.

Further, in an example implementation, the imaging manager 102 may assign a set of imaging attributes to each of the plurality of imaging zones. The set of imaging attributes is indicative of imaging settings to be applied to each of the plurality of objects identified within the respective imaging zone. The imaging settings may be scanning and printing properties associated with the object(s) which are to be subjected to the scan-only operation or the scan&print operation. In an example implementation, the set of imaging attributes comprises an image quality setting, type setting, paper size, orientation, save-as format, color format, contrast, sharpness, resolution, and tiff compression.

FIG. 2 illustrates an imaging system 200, according to an example implementation of the present subject matter. The imaging system 200, also referred to as system 200, includes the imaging manager 102, the display unit 104, and the imaging bed 106, as illustrated in FIG. 1. The display unit 104, shown in FIG. 2, may provide a visual representation 202 of objects which are simultaneously processed for imaging, where the objects are grouped within a respective imaging zone. The technique with which the objects are grouped within the respective imaging zone and the visual representation is generated is explained later in the description with reference to FIGS. 3A to 3F.

The system 200 further includes a processor 204. The processor 204 may be implemented as microprocessors, microcomputers, microcontrollers, digital signal processors, central processing units, state machines, logic circuitries, and/or any devices that manipulate signals based on operational instructions. Among other capabilities, the processor 204 may fetch and execute computer-readable instructions stored in a memory (not shown) coupled to the processor 204.

The memory can be internal or external to the imaging system 200. The memory may include any non-transitory computer-readable storage medium including, for example, volatile memory (e.g., RAM), and/or non-volatile memory (e.g., EPROM, flash memory, NVRAM, memristor, etc.).

The system 200 also includes data 206. The data 206 serves, amongst other things, as a repository for storing data that may be fetched, processed, received, or generated by the imaging manager 102. The data 206 comprises imaging zone data 208, visual image data 210 and other data 212. Imaging operations and imaging attributes assigned to a respective imaging zone may be stored in the imaging zone data 208. Visual images generated at the display unit 104 may be stored in the visual image data 210. The other data 212 may correspond to other imaging-related data stored/generated/fetched by the imaging system 200.

Figure 3A:
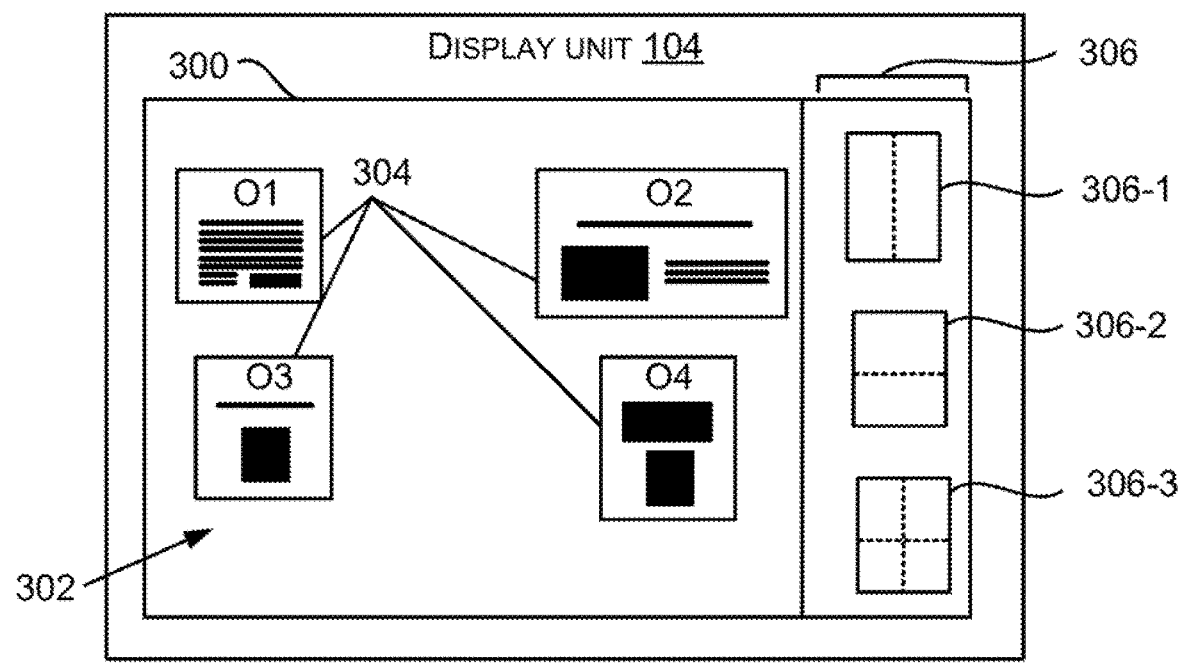
FIG. 3A illustrates a graphical user interface (GUI) displayed on a display unit of an imaging system, depicting a visual image of a plurality of objects, according to an example implementation of the present subject matter.

In operation, when a plurality of objects is arranged on the imaging bed 106 of the system 200, the imaging manager 102 generates a visual image of the plurality of objects on the display unit 104. FIG. 3A illustrates a graphical user interface (GUI) 300 displayed on the display unit 104 depicting a visual image 302 of a plurality of objects 304. The plurality of objects 304 depicted in FIG. 3A includes objects O1, O2, O3, and O4 arranged on the imaging bed 106. In an example implementation, the visual image 302 may be a preview image of the plurality of objects 304. Although in FIG. 3A four objects are being depicted, there may be more than four objects which may be scanned simultaneously.

Along with the visual image 302, the imaging manager 102 may also provide a display of a plurality of predefined zone layouts 306, also referred as zone layouts 306 within the GUI 300, as shown in FIG. 3A. Each of the zone layouts 306 are indicative of a specific pattern of a plurality of imaging zones in which the imaging bed 106 is to be divided. An imaging zone corresponds to a portion or area of the imaging bed 106 previewed and displayed in the display unit 104. The zone layouts 306 may provide two-quadrant patterns, as depicted by the zone layout 306-1 and the zone layout 306-2, or a four-quadrant pattern, as depicted by the zone layout 306-3. Although FIG. 3A illustrates three different zone layouts, there may be more than three predefined zone layouts. Also, the shapes and orientation of the zone layouts may vary. In an example implementation, the zone layouts may be formed from irregular patterns.

Figure 3B:
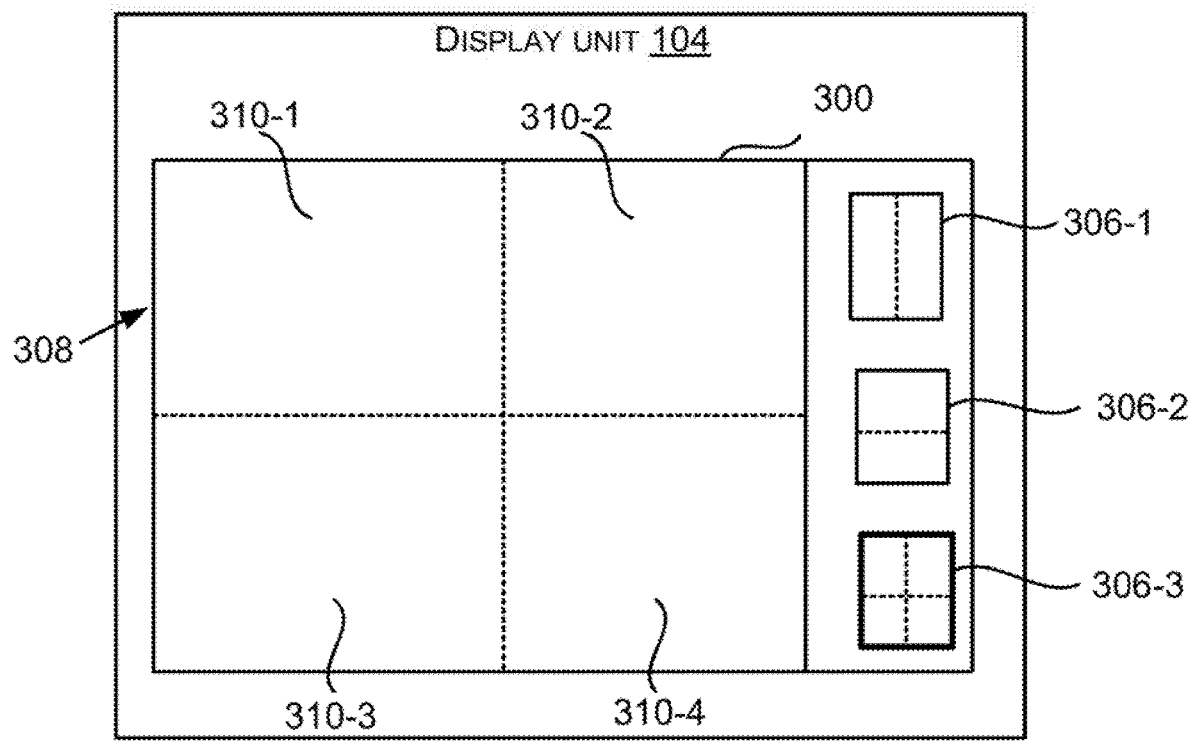
FIG. 3B illustrates the GUI, depicting a visual image of an imaging bed of the imaging system divided into a plurality of imaging zones, according to an example implementation of the present subject matter.

In an example implementation, the imaging manager 102 receives a user selection of a predefined zone layout from the plurality of predefined zone layouts 306. The user selection may be a touch-based user input on the display unit 104. In an example implementation, upon receiving the user selection, the selected zone layout may be highlighted, say, by displaying a bold outline. With reference to FIG. 3B, selection of the zone layout 306-3 is depicted by more prominent or highlighted borders of the zone layout 306-3. The imaging manager 102, based on the user selection, generates a visual image of the imaging bed 106 divided into a plurality of imaging zones to correspond to the selected predefined zone layout. In the FIG. 3B, with the zone layout 306-3 being selected, the imaging bed 106 is divided using the four-quadrant pattern of the zone layout 306-3. Thus, a visual image 308 of the imaging bed 106 divided into a first imaging zone 310-1, a second imaging zone 310-2, a third imaging zone 310-3, and a fourth imaging zone 310-4 is generated. The imaging zones 310-1 to 310-4 may collectively be referred to as the imaging zones 310.

Figure 3C:
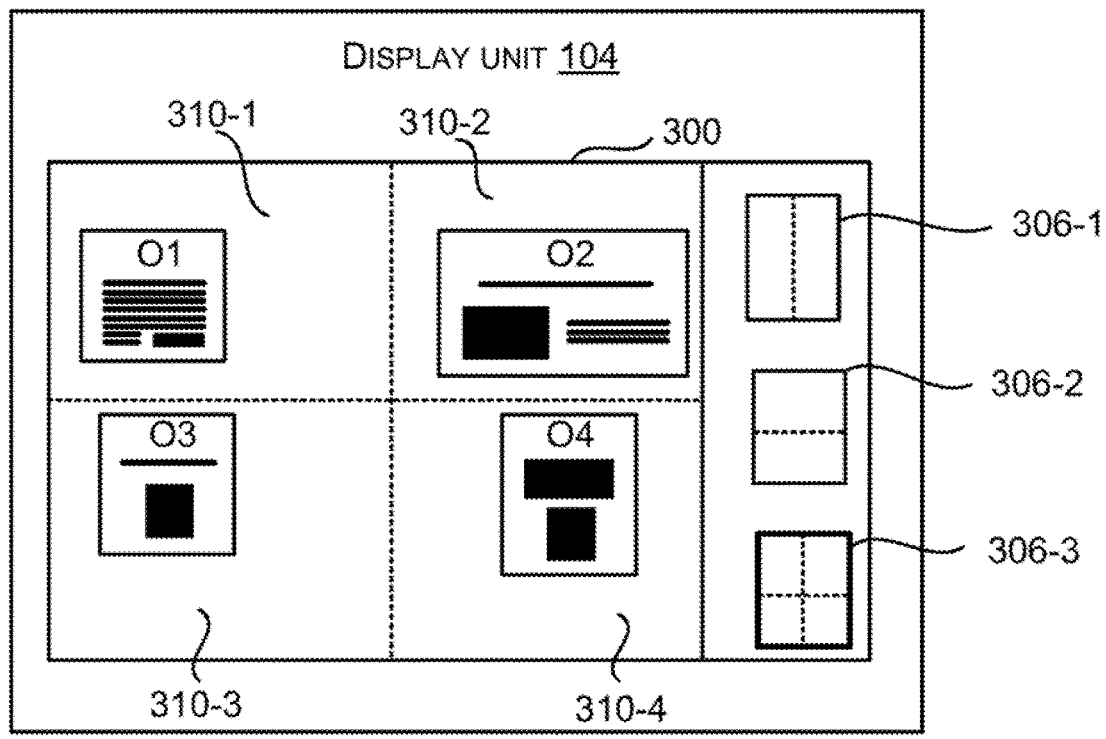
FIG. 3C illustrates the GUI, depicting a visual representation of each of the plurality of objects identified within a respective imaging zone, according to an example implementation of the present subject matter.

Upon displaying the imaging bed 106 divided into the imaging zones 310, the imaging manager 102 identifies each of the objects O1-O4 within a respective imaging zone from the imaging zones 310 and accordingly displays each of the objects O1-O4 within the respective imaging zone. In an example implementation, the imaging manager 102 may detect the edges or outlines of the objects O1-O4 by performing a pre-scan operation. The imaging manager 102, based on the detected outlines of the objects O1-O4, may identify that the object O1 is within first imaging zone 310-1, the object O2 within the second imaging zone 310-2, the object O3 within the third imaging zone 310-3, and the object O4 within the imaging zone 310-4, as illustrated in FIG. 3C.

Further, in an example scenario, an object may be arranged on the imaging bed 106 in such a manner that may result the object to overlap with multiple imaging zones from the plurality of imaging zones 310. In an example implementation, to identify each of the plurality of objects within the respective imaging zone, the imaging manager 102 determines whether an object from the plurality of objects, overlaps with multiple imaging zones. On determining that an object overlaps with the multiple imaging zones, the imaging manager 102 calculates an area of each overlapping portion of the object corresponding to each of the multiple imaging zones. The imaging manager 102 then identifies an imaging zone, from the multiple imaging zones, as the respective imaging zone of the object in which an overlapping portion of the object having a maximum area is present.

Figure 3D:
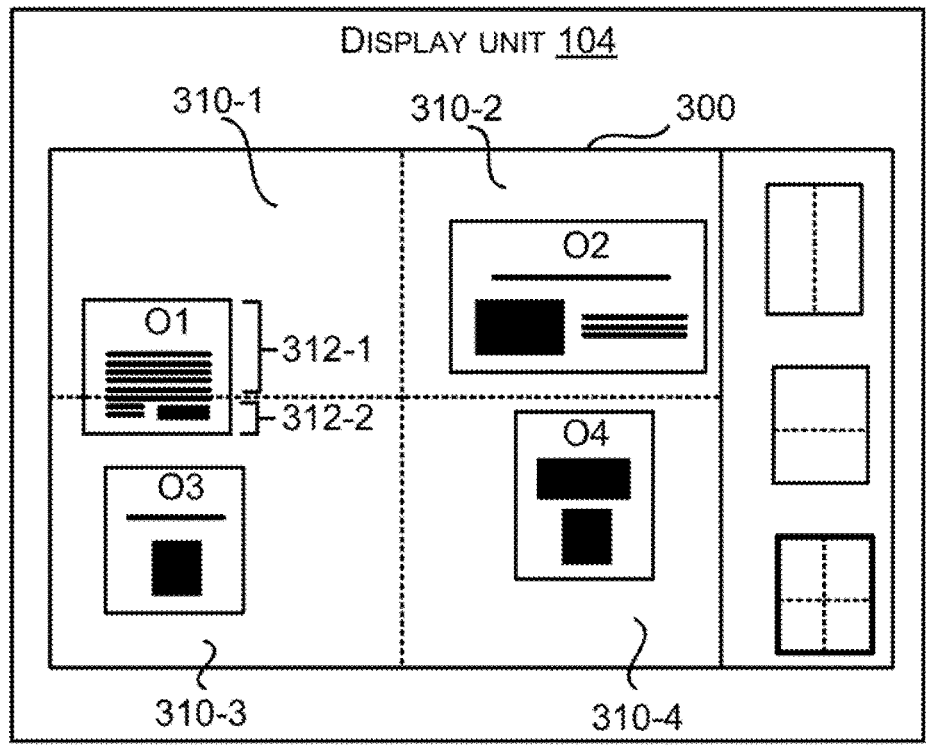
FIG. 3D illustrates the GUI, depicting an object overlapped with multiple imaging zones, according to an example implementation of the present subject matter.

The example scenario is explained with reference to FIG. 3D. As illustrated in FIG. 3D, the object O1 overlaps with the first imaging zone 310-1 and the third imaging zone 310-3. The object O1 has a first overlapping portion 312-1 within the first imaging zone 310-1 and a second overlapping portion 312-2 within the third imaging zone 310-3. The imaging manager 102 determines that the object O1 overlaps with the first and third imaging zones 310-1 and 310-3. In an example implementation, the imaging manager 102 may detect borders or outlines of the object O1 by performing a pre-scan operation to determine that the object overlaps with the first and third imaging zones 310-1 and 310-3. On determining that the object O1 overlaps with the first and third imaging zones 310-1 and 310-3, the imaging manager 102 calculates an area of each of the first and second overlapping portions 312-1 and 312-2. The imaging manager 102 then identifies the first imaging zone 310-1 as the imaging zone for the object O1, since the first overlapping portion 312-1 within the first imaging zone 310-1 has an area greater than an area of the first overlapping portion 312-2, as can be seen from FIG. 3D. Although, in FIG. 3D the object O1 is shown to overlap with two imaging zones, in an example implementation, an object may overlap with more than two imaging zones. Further, although in FIG. 3D, a single object is shown to overlap with multiple zones, more than one object may also overlap with multiple zones.

Once the objects are identified within their respective imaging zones, the imaging manager 102 assigns to each of the plurality of imaging zones a corresponding imaging operation based on a user input for the respective imaging zone. The user input for assignment of an imaging operation to the respective imaging zone may be referred to as a first user input. The imaging manager 102 also assigns a set of imaging attributes to each of the plurality of imaging zones based on a second user input for the respective imaging zone. In an example implementation, each of the first user input and the second user input may include a plurality of touch-based inputs provided by an user of the imaging system 200 for a respective imaging zone.

Figure 3E:
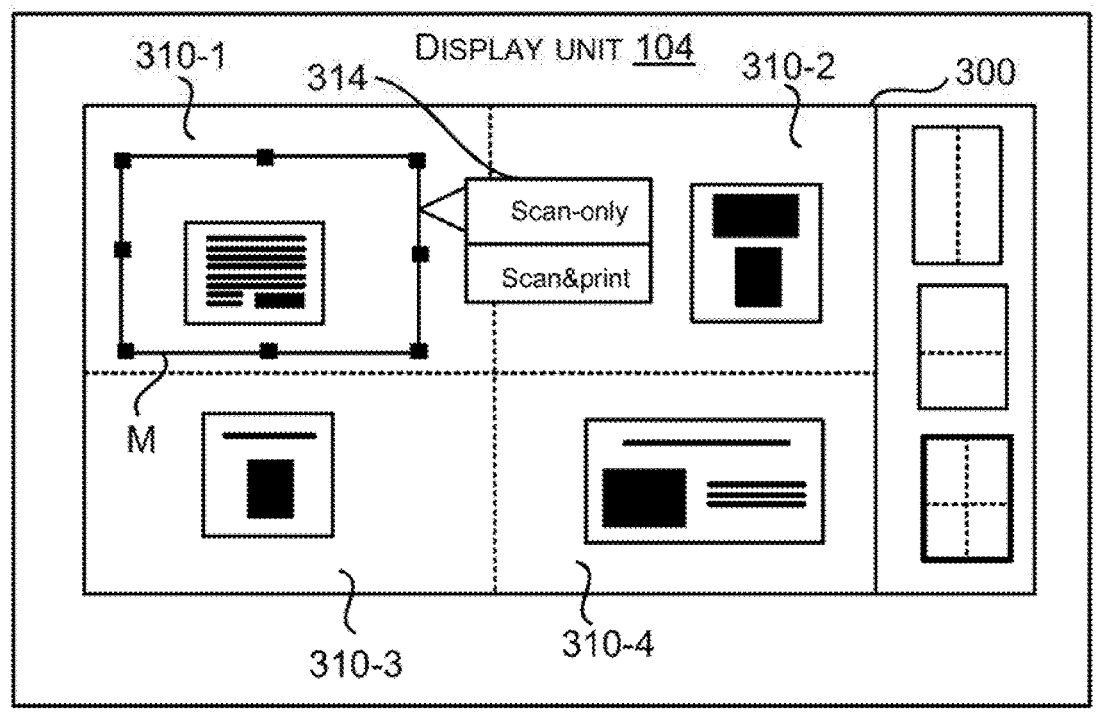
FIG. 3E illustrates the GUI, depicting assignment of an imaging operation to an imaging zone.

FIG. 3E illustrates the GUI 300 depicting assignment of an imaging operation to an imaging zone based on a first user input. The imaging manager 102 may receive a user input indicative of a selection of the first imaging zone 310-1 for specifying an imaging operation for the first imaging zone 310-1. In FIG. 3E, the first imaging zone 310-1 selected by the user is depicted by displaying a selection box 'M' over the first imaging zone 310-1. On receiving a selection of the first imaging zone 310-1, the imaging manager 102 displays at the display unit 104, user selectable options of imaging operations 314 that may be assigned to the first imaging zone 310-1. The imaging operations 314 include a scan&print operation and a scan-only operation. The imaging manager 102 then receives the first user input for the first imaging zone 310-1 indicative of a selection of one of the scan&print operation and the scan-only operation to be assigned to the first imaging zone 310-1. The imaging manager 102 assigns the selected imaging operation to the first imaging zone 310-1 based on the first user input. The imaging operation assigned to an imaging zone is to be performed on the object identified within the respective imaging zone.

Figure 3F:
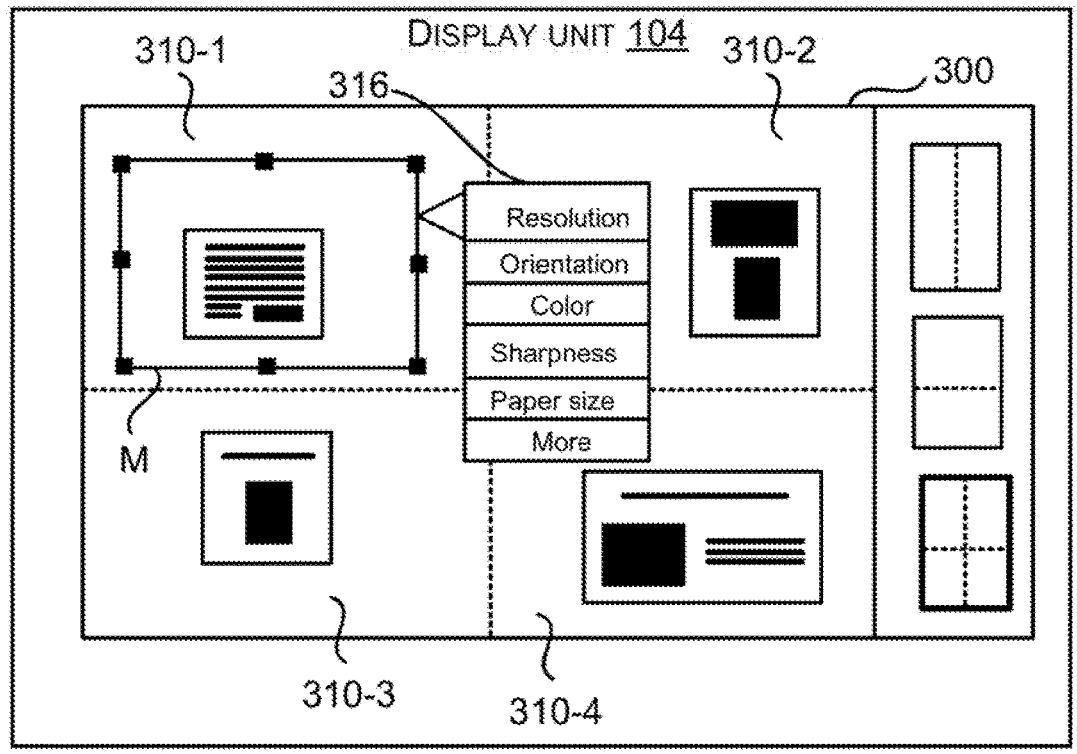
FIG. 3F illustrates the GUI, depicting assignment of a set of imaging attributes to an imaging zone.

After assignment of the imaging operation to the first imaging zone 310-1, in an example implementation, the imaging manager 102 displays at the display unit 104, user selectable options of a set of imaging attributes 316 that may be assigned to the first imaging zone 310-1, as illustrated through FIG. 3F. The set of imaging attributes 316 is indicative of imaging settings to be applied to object(s) identified within the first imaging zone 310-1. In an example implementation, the set of imaging attributes includes an image quality setting, type setting, paper size, orientation, save-as format, color format, contrast, resolution, sharpness, and tiff compression, some of which is depicted in FIG. 3F. The imaging manager 102 may then receive a second user input for the first imaging zone 310-1. In an example implementation, the second user input may be indicative of a selection of one imaging attribute or more than one imaging attribute, from the set of imaging attributes 316, along with specific values of such imaging attributes which are to be assigned to the first imaging zone 310-1. The imaging manager 102 may assign the set of imaging attributes 316 to the first imaging zone 310-1 based on the second user input.

Although, in FIGS. 3E and 3F, assignment of the imaging operation and assignment of the set of imaging attributes are shown with respect to the first imaging zone 310-1, other imaging zones 310-2 to 310-4 may also be assigned a corresponding imaging operation and a corresponding set of imaging attributes in a similar manner.

In an example implementation, the imaging manager 102 may receive the first and second user inputs for each of the imaging zones 310, collectively. In another example implementation, the imaging manager 102 may receive the first user inputs corresponding to all the imaging zones 310 and then receive the second user inputs corresponding to all the imaging zones 310.

Upon assignment of the set of imaging attributes to each of the plurality of imaging zones, the imaging manager 102 applies the set of imaging attributes to each of the plurality of objects identified within the respective imaging zone. Further, after application of the set of imaging attributes to each of the plurality of objects within the respective imaging zone, in an example implementation, the imaging manager 102 may generate a preview of each of the plurality of objects before performing the imaging operation.

After generating the previews of each of the plurality of objects with the respective imaging attributes applied to the objects, the imaging manager 102 may receive a scan command. In an example implementation, the scan command may correspond to a touch-based user input on a scan/copy icon (not shown) which may be displayed in the GUI 300. In another example implementation, the scan command may correspond to a push button input provided by the user. On receipt of the scan command, the imaging manager 102 may generate control instructions for performing the corresponding scan-only operation and the corresponding scan&print operation assigned to the respective imaging zones as per the imaging attributes of the respective imaging zones.

Figure 4:
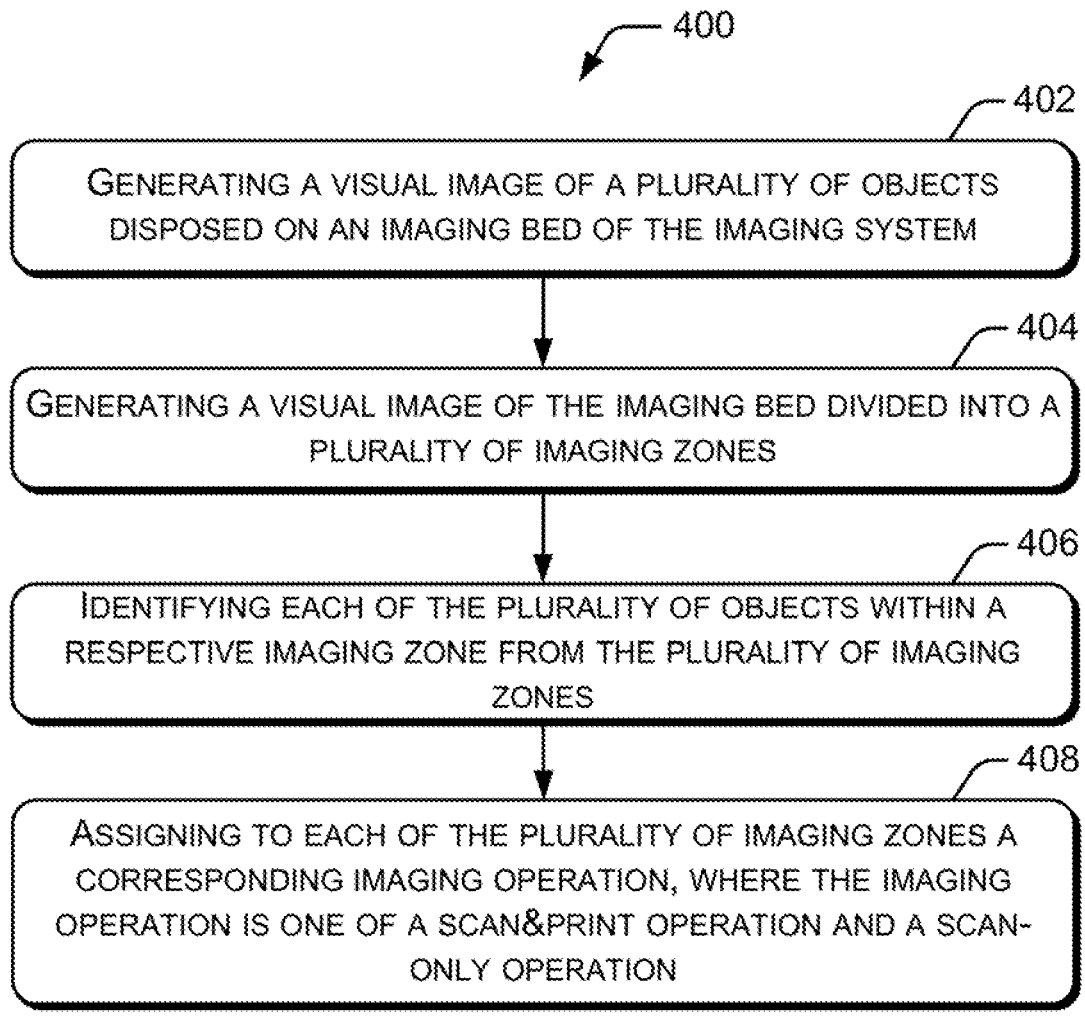
FIG. 4 illustrates a method of processing objects for imaging, according to an example implementation of the present subject matter.

FIG. 4 illustrates a method 400 of processing objects for imaging, according to an example implementation of the present subject matter. The method 400 can be implemented by processor(s) or computing device(s) through any suitable hardware, a non-transitory machine readable medium, or combination thereof. In an example implementation, the steps of the method 400 as illustrated through blocks 402 to 408 may be performed by an imaging manager, such as the imaging manager 102, of an imaging system, such as the imaging system 100 or 200. Further, although the method 400 is described in context of the aforementioned imaging systems 100 and 200, other suitable systems may be used for execution of the method 400. It may be understood that processes involved in the method 400 can be executed based on instructions stored in a non-transitory computer readable medium. The non-transitory computer readable medium may include, for example, digital memories, magnetic storage media, such as a magnetic disks and magnetic tapes, hard drives, or optically readable digital data storage media.

Referring to FIG. 4, at block 402, a visual image of a plurality of objects disposed on an imaging bed of the imaging system is generated. In an example implementation, the visual image is a previewed may be generated at a display unit of the imaging system.

At block 404, a visual image of the imaging bed divided into a plurality of imaging zones is generated. In an example implementation, the visual image of the imaging bed divided into the plurality of imaging zones may be generated based on receiving a user selection of a predefined zone layout from a plurality of predefined zone layouts. Each of the plurality of predefined zone layouts are indicative of a specific pattern of the plurality of imaging zones in which the imaging bed may be divided. In an example implementation, a display of a plurality of predefined zone layouts may be provided on the display unit and a user of the imaging system may select one of the predefined zone layouts to specify the specific pattern of imaging zones in which the imaging bed may be divided.

At block 406, each of the plurality of objects may be identified within a respective imaging zone from the plurality of imaging zones. In an example implementation, when an object is placed in the imaging bed in such a way that it overlaps with multiple imaging zones, then the object is identified within the imaging zone in which the maximum portion (area) of the object lies. The procedure of identifying the imaging zone for the object overlapping in multiple imaging zones is explained in detail later in the description with reference to FIG. 5.

Once the objects are identified within respective imaging zones, each of the plurality of imaging zones are assigned a corresponding imaging operation, at block 408. The imaging operation is one of a scan&print operation and a scan-only operation. The corresponding imaging operation is assigned to each of the plurality of imaging zones based on a user input. The user input for assignment of the corresponding imaging operation to the respective imaging zone may be referred to as a first user input. In an example implementation, the method of processing objects for imaging may further include assignment of a set of imaging attributes to each of the plurality of imaging zones based on a second user input for the respective imaging zone. The set of imaging attributes is indicative of imaging settings to be applied to each of the plurality of objects identified within the respective imaging zone. In an example implementation, the set of imaging attributes includes an image quality setting, type setting, paper size, orientation, save-as format, color format, contrast, resolution, sharpness, and tiff compression.

In an example implementation, upon assignment of the set of imaging attributes to each of the plurality of imaging zones, the set of imaging attributes may be applied to each of the plurality of objects identified within the respective imaging zone. Further, after application of the set of imaging attributes to each of the plurality of objects within the respective imaging zone, a preview of each of the plurality of objects may be generated before performing the imaging operation. After generating the previews of each of the plurality of objects with the respective imaging attributes applied to the objects, a scan command may be received based on which control instructions may be generated for performing the corresponding scan-only operation or the corresponding scan&print operation assigned to the respective imaging zone.

Figure 5:
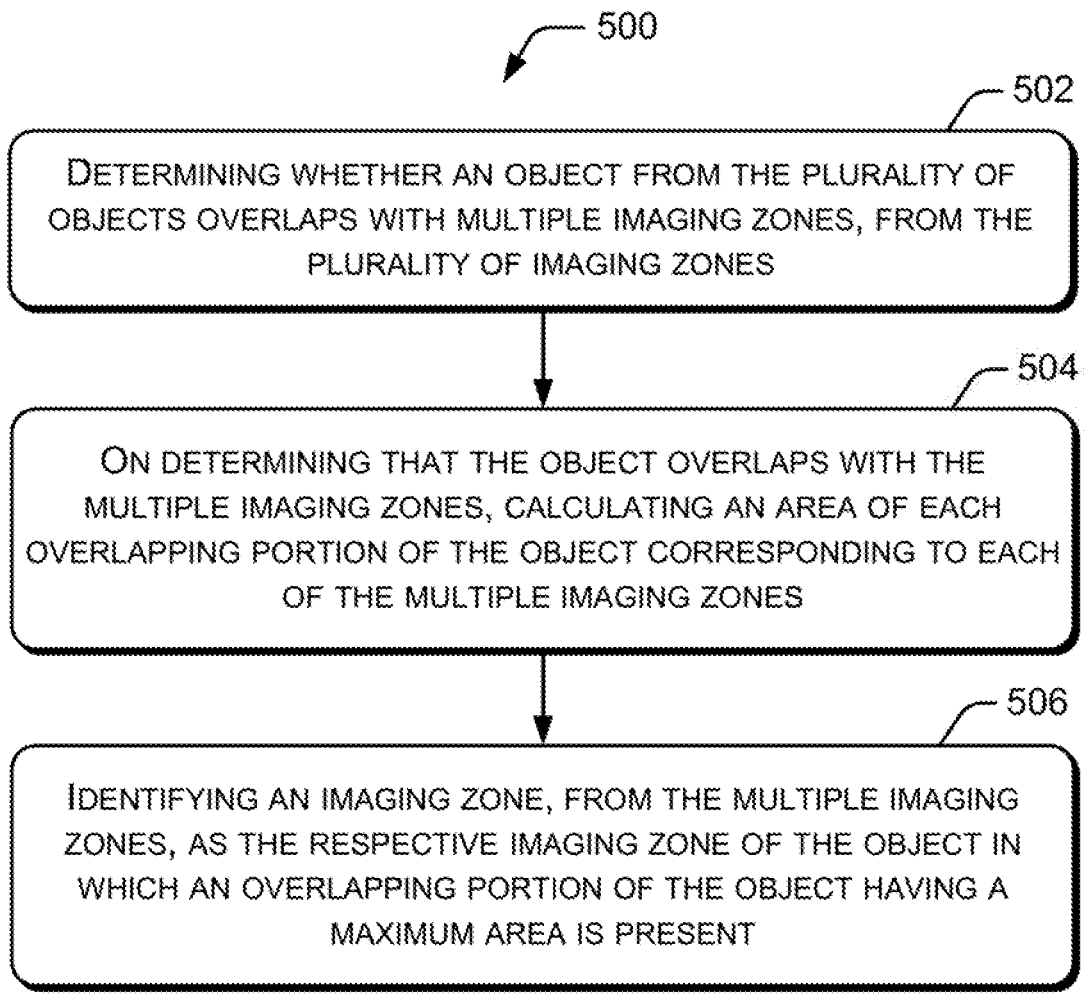
FIG. 5 illustrates a method of identifying each of the objects within a respective imaging zone, according to an example implementation of the present subject matter.

FIG. 5 illustrates a method 500 for identifying each of the objects within a respective imaging zone, according to an example implementation of the present subject matter. The method 500 explains an example procedure for identifying the respective imaging zone for each of the objects placed on the imaging bed of the imaging system. When an object is placed on the imaging bed, such that the object overlaps with multiple imaging zones, the imaging zone for such an object may be identified based on the method 500.

At block 502, it is determined whether an object from the plurality of objects overlaps with multiple imaging zones.

On determining that the object overlaps with the multiple imaging zones, at block 504, an area of each overlapping portion of the object corresponding to each of the multiple imaging zones is calculated.

At block 506, an imaging zone, from the multiple imaging zones, is identified as the respective imaging zone of the object based on the calculated area. The imaging zone in which an overlapping portion of the object having a maximum area is present is identified as the respective imaging zone for the object.

Figure 6:
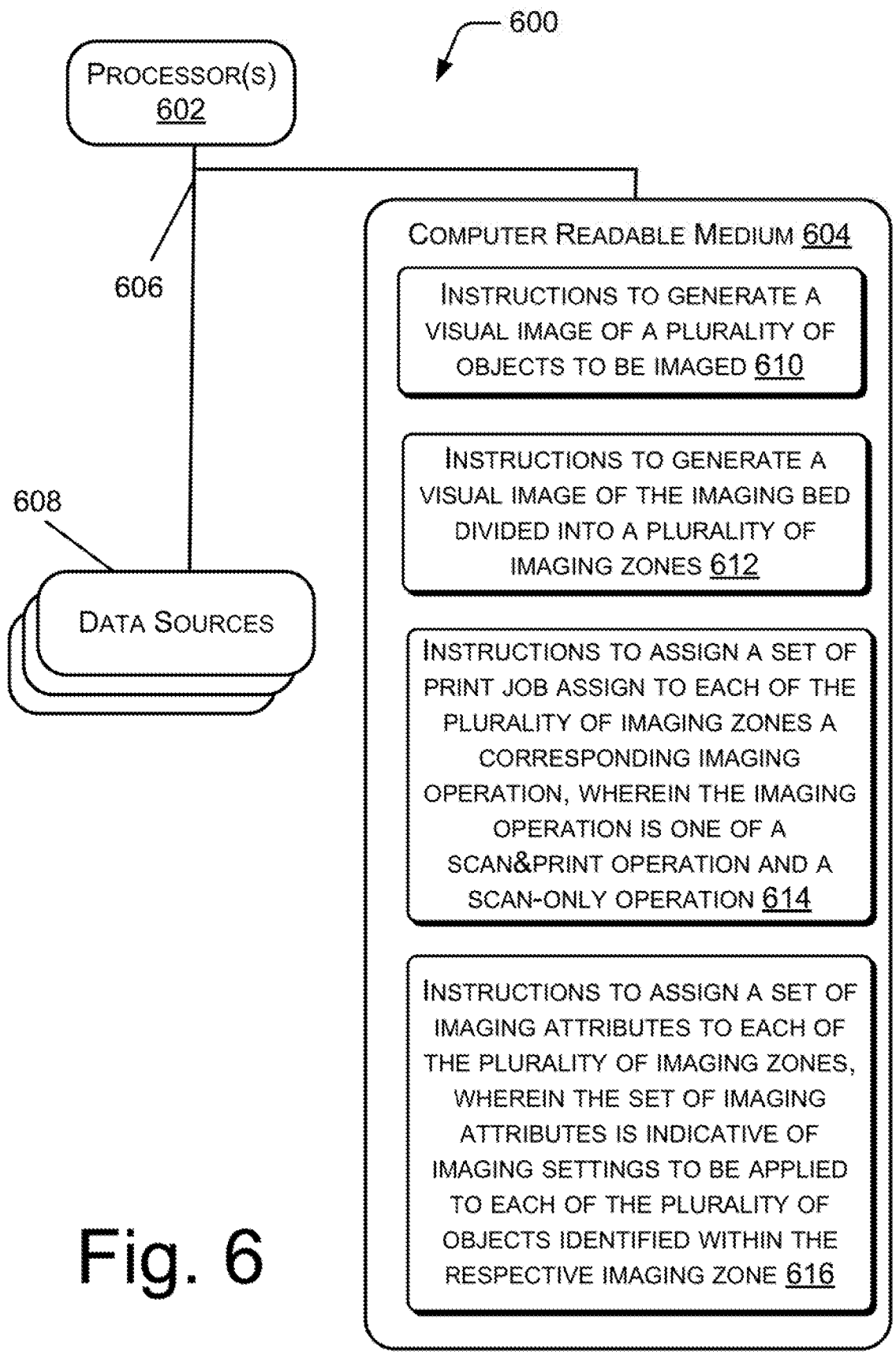
FIG. 6 illustrates a system environment implementing a non-transitory computer readable medium for processing objects to be imaged, according to an example of the present subject matter.

FIG. 6 illustrates a system environment 600 implementing a non-transitory computer readable medium for processing objects to be imaged, according to an example implementation of the present subject matter. In an example implementation, the system environment 600 includes processor(s) 602 communicatively coupled to a non-transitory computer readable medium 604 through a communication link 606. In an example implementation, the processor(s) 602 may be a processor of an imaging system, such as the imaging systems 100 and 200. In an example, the processor(s) 602 may have one or more processing resources for fetching and executing computer-readable instructions from the non-transitory computer readable medium 604.

The non-transitory computer readable medium 604 can be, for example, an internal memory device or an external memory device. In an example implementation, the communication link 606 may be a direct communication link, such as any memory read/write interface.

The processor(s) 602 and the non-transitory computer readable medium 604 may also be communicatively coupled to data sources 608 over the network. The data sources 608 can include, for example, memory of the imaging system.

In an example implementation, the non-transitory computer readable medium 604 includes a set of computer readable instructions which can be accessed by the processor(s) 602 through the communication link 606 and subsequently executed to perform acts for processing of objects to be imaged by an imaging system.

Referring to FIG. 6, in an example, the non-transitory computer readable medium 604 includes instructions 610 that cause the processor(s) 602 to generate a visual image of a plurality of objects to be imaged by the imaging system.

The non-transitory computer readable medium 604 includes instructions 612 that cause the processor(s) 602 to generate a visual image of an imaging bed of the imaging system divided into a plurality of imaging zones. In an example implementation, for generation the visual image of the imaging bed divided into the plurality of imaging zones, the instructions 612 may cause the processor(s) 602 to receive a user selection of a predefined zone layout from a plurality of predefined zone layouts. Each of the plurality of predefined zone layouts are indicative of a specific pattern of the plurality of imaging zones in which the imaging bed may be divided.

The non-transitory computer readable medium 604 includes instructions 614 that cause the processor(s) 602 to identify each of the plurality of objects within a respective imaging zone from the plurality of imaging zones. In an example implementation, for identification of each of the plurality of objects within the respective imaging zone, the instructions 614 may cause the processor(s) 602 to determine whether an object from the plurality of objects overlaps with multiple imaging zones, from the plurality of imaging zones. On determining that the object overlaps with the multiple imaging zones, the instructions 614 may cause the processor(s) 602 to calculate an area of each overlapping portion of the object corresponding to each of the multiple imaging zones. Further, the instructions 614 may cause the processor(s) 602 to identify an imaging zone, from the multiple imaging zones, as the respective imaging zone of the object in which an overlapping portion of the object having a maximum area is present.

The non-transitory computer readable medium 604 includes instructions 616 that cause the processor(s) 602 to assign a set of imaging attributes to each of the plurality of imaging zones, where the set of imaging attributes is indicative of imaging settings to be applied to each of the plurality of objects identified within the respective imaging zone. Further, the non-transitory computer readable medium 604 may include instructions for performing methods described through FIGS. 4 and 5, or a combination thereof.

Although implementations of processing objects for imaging, have been described in language specific to structural features and/or methods, it is to be understood that the present subject matter is not limited to the specific features or methods described. Rather, the specific features and methods are disclosed and explained as example implementations of processing objects for imaging.

We claim:

1. A method of processing objects for imaging in an imaging system, comprising:
   generating a visual image of a plurality of objects disposed on an imaging bed of the imaging system;
   generating a visual image of the imaging bed divided into a plurality of imaging zones;
   identifying each of the plurality of objects within a respective imaging zone from the plurality of imaging zones based on the visual image of the plurality of objects and the visual image of the imaging bed divided into the plurality of imaging zones;
   in response to the identification, assigning to each of the plurality of imaging zones a corresponding imaging operation, wherein the corresponding imaging operation assigned to each of the plurality of imaging zones is one of a scan&print operation and a scan-only operation; and
   performing the corresponding imaging operation for each of the plurality of imaging zones based on the assignment.

2. The method as claimed in claim 1, wherein identifying each of the plurality of objects within the respective imaging zone comprises:
   determining whether an object from the plurality of objects overlaps with multiple imaging zones, from the plurality of imaging zones;
   in response to determining that the object overlaps with the multiple imaging zones, calculating an area of each overlapping portion of the object corresponding to each of the multiple imaging zones; and
   identifying an imaging zone, from the plurality of imaging zones, as the respective imaging zone of the object in which an overlapping portion of the object having a maximum area is present, wherein the corresponding imaging operation assigned to each of the plurality of imaging zones is based on the respective identified imaging zones.

3. The method as claimed in claim 1, wherein generating the visual image of the imaging bed divided into the plurality of imaging zones comprises receiving, at the imaging system, a user selection of a predefined zone layout from a plurality of predefined zone layouts, each of the plurality of predefined zone layouts indicative of a specific pattern of the plurality of imaging zones in which the imaging bed is to be divided and generating the visual image of the imaging bed divided into the plurality of imaging zones based on the user selection.

4. The method as claimed in claim 1, wherein the corresponding imaging operation is assigned to each of the plurality of imaging zones based on a user input.

5. The method as claimed in claim 1, further comprising assigning a set of imaging attributes to each of the plurality of imaging zones, wherein the set of imaging attributes is indicative of imaging settings to be applied to each of the plurality of objects identified within the respective imaging zone.

6. The method as claimed in claim 5, further comprising:
   based on the assignment of the set of imaging attributes to each of the plurality of imaging zones, applying the set of imaging attributes to each of the plurality of objects identified within the respective imaging zone; and
   after application of the set of imaging attributes to each of the plurality of objects within the respective imaging zone, generating a preview of each of the plurality of objects within the respective imaging zone before performing the corresponding imaging operation.

7. The method as claimed in claim 5, wherein the set of imaging attributes comprises an image quality setting, type setting, paper size, orientation, save-as format, color format, contrast, sharpness, resolution, and tiff compression.

8. The method as claimed in claim 1, wherein generating the visual image of the plurality of objects, the visual image of the imaging bed, identifying each of the plurality of objects within the respective imaging zone, and assigning the corresponding imaging operations comprises a pre-scan operation of the imaging system, and wherein performing the corresponding imaging operation for each of the plurality of imaging zones includes scanning each of the plurality of objects based on the assignment.

9. The method as claimed in claim 8, wherein performing the corresponding imaging operation for each of the plurality of imaging zones is in response to receipt of a scan command which causes at least one scan&print operation and at least one scan-only operation executed on the plurality of objects.

10. An imaging system comprising:
    an imaging bed to arrange a plurality of objects on;
    a display unit; and
    an imaging manager to process the plurality of objects, wherein the imaging manager is to:
      generate, at the display unit, a visual image of the plurality of objects;
      generate, at the display unit, a visual image of the imaging bed divided into a plurality of imaging zones;
      identify each of the plurality of objects within a respective imaging zone from the plurality of imaging zones based on the visual image of the plurality of objects and the visual image of the imaging bed divided into the plurality of imaging zones;
      in response to the identification, assign, to each of the plurality of imaging zones, a corresponding imaging operation, wherein the corresponding imaging operation assigned to each of the plurality of imaging zones is one of a scan&print operation and a scan-only operation; and
      assign a set of imaging attributes to each of the plurality of imaging zones, wherein the set of imaging attributes assigned to each of the plurality of imaging zones is indicative of imaging settings to be applied to each of the plurality of objects identified within the respective imaging zone; and
      perform the corresponding imaging operation for each of the plurality of imaging zones, the corresponding imaging operations performed including a scan of each of the plurality of objects based on the assigned corresponding imaging operations and set of imaging attributes.

11. The imaging system as claimed in claim 10, wherein to identify each of the plurality of objects within the respective imaging zone, the imaging manager is to:
    determine whether an object from the plurality of objects overlaps with multiple imaging zones, from the plurality of imaging zones;
    in response to determining that the object overlaps with the multiple imaging zones, calculate an area of each overlapping portion of the object corresponding to each of the multiple imaging zones; and
    identify an imaging zone, from the multiple imaging zones, as the respective imaging zone of the object in which an overlapping portion of the object having a maximum area is present, wherein the corresponding imaging operation assigned to each of the plurality of imaging zones and for each of the plurality of objects is based on the identified imaging zone.

12. The imaging system as claimed in claim 10, wherein to generate the visual image of the imaging bed divided into the plurality of imaging zones, the imaging manager is to receive a user selection of a predefined zone layout from a plurality of predefined zone layouts, each of the plurality of predefined zone layouts indicative of a specific pattern of the plurality of imaging zones in which the imaging bed is to be divided.

13. The imaging system as claimed in claim 10, wherein the corresponding imaging operation is assigned to each of the plurality of imaging zones based on a first user input to the imaging system for the respective imaging zone and the set of imaging attributes is assigned to each of the plurality of imaging zones based on a second user input to the imaging system for the respective imaging zone.

14. The imaging system as claimed in claim 10, wherein the imaging manager is further to:
based on the assignment of the set of imaging attributes to each of the plurality of imaging zones, apply the set of imaging attributes to each of the plurality of objects identified within the respective imaging zone;
after application of the set of imaging attributes to each of the plurality of objects within the respective imaging zone, generate a preview of each of the plurality of objects before performing the corresponding imaging operation; and
based on a user input to the imaging system, perform the corresponding imaging operation for each of the plurality of imaging zones.

15. The imaging system as claimed in claim 10, wherein the imaging manager is to perform the corresponding imaging operation for each of the plurality of imaging zones including the scan of each of the plurality of objects and a print of a subset of the plurality of objects based on the assigned corresponding imaging operations and set of imaging attributes.

16. A non-transitory computer-readable medium comprising computer-readable instructions, the computer-readable instructions for processing of objects to be imaged by an imaging system, when executed by a processor of the imaging system, cause the processor to:
generate a preview visual image of a plurality of objects;
generate a preview visual image of the imaging bed divided into a plurality of imaging zones based on a user selection of the plurality of imaging zones from a plurality of predefined zone layouts;
identify each of the plurality of objects within a respective imaging zone from the plurality of imaging zones based on the preview visual image of the plurality of objects and the preview visual image of the imaging bed divided into the plurality of imaging zones;
in response to the identification of each of the plurality of objects within the respective imaging zone, assign, to each of the plurality of imaging zones, a corresponding imaging operation, wherein the imaging operation assigned to each of the plurality of imaging zones is one of a scan&print operation and a scan-only operation;
assign a set of imaging attributes to each of the plurality of imaging zones, wherein the set of imaging attributes assigned to each of the plurality of imaging zones is indicative of imaging settings to be applied to each of the plurality of objects identified within the respective imaging zone; and
perform the corresponding imaging operation for each of the plurality of imaging zones, the corresponding imaging operations performed including a scan of each of the plurality of objects based on the assigned imaging operations and set of imaging attributes.

17. The non-transitory computer-readable medium as claimed in claim 16, wherein the computer-readable instructions to identify each of the plurality of objects within the respective imaging zone, when executed by the processor, cause the processor to:
determine whether an object from the plurality of objects overlaps with multiple imaging zones, from the plurality of imaging zones;
in response to determining that the object overlaps with the multiple imaging zones, calculate an area of each overlapping portion of the object corresponding to each of the multiple imaging zones; and
identify an imaging zone, from the multiple imaging zones, as the respective imaging zone of the object in which an overlapping portion of the object having a maximum area is present, wherein the corresponding imaging operations assigned to each of the plurality of imaging zones and for each of the plurality of objects is based on the identified imaging zone.

18. The non-transitory computer-readable medium as claimed in claim 16, wherein the computer-readable instructions to generate the preview visual image of the imaging bed divided into the plurality of imaging zones when executed by the processor, cause the processor to receive a user selection of a predefined zone layout from the plurality of predefined zone layouts, each of the plurality of predefined zone layouts indicative of a specific pattern of the plurality of imaging zones in which the imaging bed is to be divided, and generate the preview visual image based on the user selection.

19. The non-transitory computer-readable medium as claimed in claim 16, wherein the computer-readable instructions to assign, to each of the plurality of imaging zones, the corresponding imaging operation when executed by the processor, cause the processor to:
assign the corresponding imaging operation to each of the plurality of imaging zones based on a first user input to the imaging system; and
assign the set of imaging attributes to each of the plurality of objects identified within the respective imaging zone based on a second user input to the imaging system.

20. The non-transitory computer-readable medium as claimed in claim 16, wherein the instructions when executed by the processor of the imaging system, cause the processor to, in response to identification of each of the plurality of objects within the respective imaging zone, display, on a display unit of the imaging system, the plurality of objects in the preview visual image of the imaging bed divided into the plurality of imaging zones.

* * * * *